United States Patent
Mayer

[15] 3,660,107
[45] May 2, 1972

[54] EFFERVESCENT BEVERAGE POWDER AND TABLETED BEVERAGE COMPOSITIONS

[72] Inventor: Frederick S. Mayer, San Rafael, Calif.
[73] Assignee: Meyer Laboratories, Inc.
[22] Filed: Jan. 23, 1970
[21] Appl. No.: 5,376

[52] U.S. Cl. ........................................99/66, 99/25, 99/77, 99/78
[51] Int. Cl. ..........................................A23f 1/12, A23l 1/00
[58] Field of Search ..........................99/66, 78, 71, 79, 25

[56] References Cited

UNITED STATES PATENTS

| | | | |
|---|---|---|---|
| 1,002,137 | 8/1911 | Carreras | 99/71 |
| 3,136,692 | 6/1964 | Bandelin | 99/78 X |
| 2,889,226 | 6/1959 | Hinkley | 99/66 |
| 3,441,417 | 4/1969 | Feldman et al. | 99/79 |
| 541,255 | 6/1895 | Wichmann | 99/78 |

*Primary Examiner*—Frank W. Lutter
*Assistant Examiner*—William L. Mentlik
*Attorney*—Warren, Rubin, Brucker & Chickering

[57] ABSTRACT

A food mixture of an effervescent couple tartaric acid, citric acid plus sodium bicarbonate having the relative proportions 2:1:4 respectively and solid flavorant of coffee, decaffeinated coffee, tea or chocolate which upon the addition of water yields a beverage.

7 Claims, No Drawings

EFFERVESCENT BEVERAGE POWDER AND TABLETED BEVERAGE COMPOSITIONS

This invention relates to a novel effervescent couple useful for the preparation of self-dissolving solid beverage extracts in tablet form. More particularly it relates to an effervescent couple which dissolves in water without producing the objectionable and unpalatable saline or metallic flavor normally associated with these couples. Still more particularly it relates to self-dissolving tablets of coffee or tea containing the foregoing couple as the solubilizing agent.

Effervescent couples have long been known and used in the beverage art, particularly for the production of tablets containing solid flavoring material which when placed in water yield soda-type or tart, fruity flavored beverages. These couples comprise in general a common solid edible organic acid and an alkali metal or alkaline earth metal bicarbonate or carbonate. While these couples as known in the art produce a saline or metallic flavor in water, the overriding taste and/or odor of the flavoring material normally employed for example grape, lime, orange and the like, and for tart beverages the presence of excess acid as in conventional use, satisfactorily masks the aforementioned unpalatable side flavors. In the case of mild or bland flavoring materials, for example for the preparation of coffee, tea, and the like beverages, these effervescent couples have not been satisfactory or useful solubilizing agents. Thus in U.S. Pat. No. 2,889,226, it is disclosed that common edible acids such as citric, tartaric, and the like acids are entirely unsatisfactory acidifier components for an effervescent couple in the preparation of tablets where a delicate flavor, such as coffee, is concerned. Similarly, in U.S. Pat. No. 3,441,417. the disclosure is made that alkali metal tartrate or citrate salts are unsatisfactory for many beverages because of the saline taste which such salts impart to these beverages.

It has now been found that the mixture tartaric acid, citric acid and sodium bicarbonate having the weight ratio of about 2 to 1 to 4, respectively, is an effervescent couple which is especially useful for preparation of self-dissolving solid flavoring materials, yielding upon the addition of water delicately flavored beverages such as coffee, tea and the like. Surprisingly this particular weight combination of tartaric and citric acids and the salt resulting from the effervescing action do not render mild beverages unpalatable. The flavor of coffee prepared from tablets containing the present effervescent couple and a dried coffee extract is for all practical purposes indistinguishable from coffee prepared from the extract per se. One particular advantage of the tablet form in contrast to a granulated flavor extract, of course, is the ability to reproducibly and conveniently prepare from tablets a cup, a carafe, a pot, etc. of the beverage at the desired strength.

The solids employed for the preparation of the self-dissolving compositions herein should be finely divided, that is thoroughly pulverized. They will in general have average particle diameters below about 1,000 microns and above about 35 microns. Preferably they should be substantially anhydrous but the presence of a minor amount of water, for example up to about 1 weight percent, is usually not unduly deleterious in terms of the shelf life of the compounded mixture.

For best results the pulverized solids are thoroughly mixed into a loose mixture using the desired proportions by weight of the effervescent couple components and solid flavor extract. The mixture is then fed to a suitable tablet maker.

The amount of the effervescent couple desirably used varies depending upon the particular solid flavor extract being used and in general in parts by weight for each 100 parts of the extract, an amount of the couple in the range from about 26 to 36 parts, preferably 30 to 32 parts, should be used.

In addition to the flavorant or solid extract and the effervescent couple, one or more other ingredients such as sugar, artificial sweeteners, powdered cream and the like may be added with efficient mixing into the loose mixture to be fed to the tableting machine.

The effervescent couple of the present invention is useful in general for the production of self-dissolving water soluble solid mixtures i.e. solid effervescent beverage compositions, medicinal concoctions, and most particularly and preferably solid pulverizable flavorants useful for the preparation of delicately flavored aqueous beverages such as coffee, tea, cocoa, and the like.

In a preferred embodiment pure (U.S.P.) or food grade sodium bicarbonate, tartaric acid and citric acid was completely pulverized (average diameter in the range 50 to 200 microns) and thoroughly mixed to produce the effervescent couple in a mixture having a weight ratio of 4:2:1 respectively, A similarly pulverized solid dried coffee extract, for example of the freeze dried variety, was then efficiently mixed with couple in the ratio of 100 parts of the coffee extract per 31 parts of the effervescent couple. The resulting mixture, a loose free flowing composite, was then compressed into tablets of the 2 gram size in a commercial tablet maker. These tablets dissolved rapidly in hot or cold water leaving no floating scum or residue and the flavor was excellent.

In a similar manner and with comparable results self-dissolving beverage tablets varying in size and containing additional ingredients were prepared with each of the flavorants decaffeinated coffee, coffee, tea, and chocolate (cocoa). The ingredient combinations were powdered cream, powdered cream and sugar, powdered cream and sugar substitute, or sugar substitutes in suitable amounts i.e. to taste (one to five parts per part of flavorant). These tablets when placed in water, hot or cold, dissolved rapidly and the resulting beverages had palatable and pleasing flavors.

In addition to sodium bicarbonate, which is preferred, potassium bicarbonate, sodium or potassium carbonate or mixtures thereof may be used provided that the relative proportions must be the stoichiometric equivalent of the sodium bicarbonate.

I claim:

1. A dry free-flowing powdered composition suitable for producing self-dissolving water soluble beverage tablets which comprises an effervescent couple and a solid flavorant selected from the group consisting of coffee, decaffeinated coffee, tea and chocolate, said couple consisting essentially of tartaric acid, citric acid and sodium bicarbonate in admixture proportionately in parts by weight in the ratio of about 2:1:4 respectively, wherein for each 100 parts by weight of the flavorant, an amount of the couple in the range from about 26 to 36 parts by weight is present in the composition.

2. The composition as in claim 1 further characterized in that at least one further component selected from the group consisting of sugar, powdered cream, and a powdered sugar substitute is also present in the mixture in a suitable amount.

3. The composition as in claim 1 further characterized in that the flavorant is a freeze dried coffee extract, and in that for each 100 parts of the extract there is present about 31 parts of the effervescent couple.

4. A self-dissolving beverage tablet comprising as a formed body a homogeneous mixture of 100 parts of a flavorant selected from the group consisting of coffee, decaffeinated coffee, tea and chocolate with an amount of an effervescent couple in the range from about 26 to 36 parts, said couple consisting essentially of tartaric acid, citric acid and sodium bicarbonate in admixture proportionately in the part ratio of about 2:1:4 respectively, said parts being by weight.

5. The tablet as in claim 4 further characterized in that at least one further component selected from the group consisting of sugar, powdered cream and a powdered sugar substitute is also present in the mixture in a suitable amount.

6. The tablet as in claim 4 further characterized in that the flavorant is a freeze dried coffee extract, and in that for each 100 parts of the extract there is present about 31 parts of the effervescent couple.

7. The tablet as in claim 4 further characterized in that a suitable amount of at least one further component selected from the group consisting of sugar, powdered cream and powdered sugar substitute is also present in the mixture in a suitable amount.

* * * * *